Patented July 9, 1940

2,206,906

UNITED STATES PATENT OFFICE 2,206,906

RESINOUS CONDENSATES AND METHOD OF PRODUCING SAME

Karl Loos, Lancaster, Pa.

No Drawing. Application February 27, 1937, Serial No. 128,276

20 Claims. (Cl. 260—42)

The present invention relates to the production of resins suitable for casting and obtained by the condensation of an aldehyde, preferably formaldehyde, with phenol or with urea or substituted ureas, or with mixtures of phenol and a urea.

This application is a continuation-in-part of my copending application Serial No. 675,095, filed June 9, 1933.

As is known, the transparent, translucent or opaque character of a phenol formaldehyde resinous condensation product (that is, one to which no opacifying agent has been added), and also other properties of the product, depends to a large extent upon the degree to which the water of solution and water of reaction are expelled from the still liquid condensation mass. It is, however, frequently difficult to dehydrate tne condensate to the desired degree because the distillation of the resin is accompanied by further condensation and polymerization which make the resin more and more viscous, so that frequently it is found that the desired degree of dehydration cannot be obtained before the condensate reaches the limit of viscosity for pouring into molds.

It has been the practice to retard the arrival of the highly viscous state and thereby permit distillation for a longer period of time by the use of a high vacuum which enables evaporation to take place at lower temperatures, but even with such expedient the temperature of distillation gradually increases and the condensate rapidly approaches the condition in which it can no longer be poured. It is also known to add plasticizers, such as glycerine, triacetin, etc., to the condensate during its formation, but the known plasticizers, while they permit distilling of the resin even to the point of practically complete expulsion of the water with the obtainment of a transparent product, undesirably affect the properties of the resin, whether from the standpoint of resistance to water, strength, toughness, stability, color or in other respects.

I have found that a highly satisfactory dehydration of phenolic and urea resins can be accomplished with the aid of a condensation product of acetone and formaldehyde. This condensation product, which has been named heptahydric alcohol (M. Apel and B. Tollens, Ber., 1894, 1087) appears to retard the further condensation and polymerization of the resinous reaction mass during the distillation, permitting the expulsion of the water of solution and subsequently of water of reaction to any desired degree while the resin remains sufficiently fluid for pouring. This material thus possesses all of the desirable plasticizing properties of known plasticizers, but is distinguished over the latter by the fact that it does not unfavorably affect the water resistance, strength, stability, machinability or other properties of the product. These improved properties of the final product are probably due to the fact that the reaction retarder employed by me is composed of a substance or substances which not only are compatible with phenol and urea resins, but are in fact resinifying or of resin-forming character so that, particularly after the curing of the resin, the reaction retarder is present in the final product, not in its original condition, but in a condensed and/or polymerized resinous state. The final product is thus most probably a single phase resinous system (leaving out of consideration any water that may be present), as contrasted with known plasticized resins which are composed of a resinous phase and a non-resinous plasticizer phase.

The reaction retarding agent according to the invention may be prepared by condensing one mol of acetone with approximately 4 to 6 mols of formaldehyde in the presence of a small amount of basic catalyst at a temperature which is preferably no higher than is required to start the exothermic reaction. Preferably, the reaction is stopped when a colorless, water-soluble alcohollike condensate is obtained. The ketone-formaldehyde condensation product so obtained combines excellently with condensation products of formaldehyde with phenol and/or a urea and yields a product which is unusually tough and easily machinable, is stable, can be given a very high polish, and can be made water-clear, cloudy, or opaque white by controlling the degree of reaction or dehydration prior to the pouring and curing.

As already indicated, the ketone-formaldehyde condensate may be employed both with phenol-formaldehyde, and with urea-formaldehyde resins and also with mixtures of such resins. The condensation in the presence of the ketone-formaldehyde reaction product can be carried even further than has been possible hitherto, without danger of reaching a too viscous condition. The plasticizing or polymerization-retarding character of the ketone-formaldehyde condensation products is so pronounced that the phenol-formaldehyde or urea-formaldehyde resins with which they are to be mixed can be reacted to a much greater extent than heretofore before the distillation is begun, so that losses in raw material, especially formaldehyde, are practically completely avoided.

The invention will be described in greater detail in the following examples but it is to be understood that the latter are presented by way of illustration only and that the invention is not limited thereto.

*Example 1.*—30 grams of acetone and 252 grams formaldehyde (37% by weight), the molecular proportion being 1:6, are heated gently with 6 to 10 cc. 1N NaOH sol. in a reflux condenser. After the exothermic reaction has subsided, the heating is continued to keep the material boiling for 15 to 30 minutes. In another flask 300 grams phenol and 400 grams of 37% formaldehyde (by weight) are condensed under reflux with 6 grams of NaOH for 30 minutes.

Both products are then mixed together and heated under reflux for 20 minutes. The mixture is acidified with 30 cc. of lactic acid and again heated under reflux for about 25 to 30 minutes until a hydrophobe resinous product precipitates out. The resinous mass is distilled to any desired degree of dehydration, is then poured into moulds and hardened at a temperature of 60° to 80° C. In about 3 to 4 days, when the dehydration has been only partial, a hard, tough, translucent plastic is obtained which has excellent working qualities, being easily cut, drilled, turned and polished.

*Example 2.*—300 grams phenol, 300 grams formaldehyde (37% by weight) and 3 grams NaOH are condensed for 20 minutes under reflux. There are then added 250 grams formaldehyde (37%) and 4.5 grams NaOH and the mixture further condensed under reflux for 20 minutes. The mass is then acidified with 30 cc. lactic acid and the condensation continued under reflux for about 30 minutes until the resin separates from the water. Thereto a condensation product from 30 gr. acetone and 84 grams formaldehyde (37%) (the ratio being 1 mol to 2 mols) is added and the mixture distilled to a thick viscous mass which is then poured into mould and hardened at 60° to 80° C. for 4 to 5 days, whereupon a tough, translucent, high quality plastic is obtained. If an opaque white material is desired, 30 grams of urea are added at approximately 70° C. during distillation. The material then hardens in 2 to 3 days at the above-mentioned temperature to an opaque, white, very strong and easy workable material.

*Example 3.*—30 grams acetone and 252 grams of 37% formaldehyde (1 mol to 6 mols) are condensed with 10 cc. of 1N NaOH solution for about 30 minutes. The resulting heptahydric alcohol is then added to a condensation product obtained by boiling 200 grams phenol, 200 grams (37%) formaldehyde and 5 grams NaOH under reflux for about 30 minutes. The mixture is boiled under reflux for about 20 minutes, acidified with 20 cc. lactic acid and the resulting hydrophobe resin which precipitates out is distilled with 30 cc. methylphthalylethylglycollate to substantially complete dehydration. The material is then poured into moulds and heated at 70–80° C. for 5 days. A very light colored, transparent, tough and very easily machinable material is obtained.

*Example 4.*—30 grams acetone and 252 grams of 37% formaldehyde (1 mol to 6 mols) are condensed with 10 cc. of 1N NaOH solution for about 30 minutes. The resulting heptahydric alcohol is then added to a mixture of a phenol-formaldehyde resin made by boiling 300 grams phenol and 300 grams of 37% formaldehyde with 6 grams NaOH for 30 minutes under a reflux condenser, and a urea-formaldehyde resin made by condensing 45 grams urea and 152 grams 37% formaldehyde (1 mol to 2.5 mols) with the aid of 7 cc. ammonium sulfide (saturated solution) for 30 minutes under reflux. The whole mixture is then boiled under reflux for 30 minutes, and acidified with 30 cc. lactic acid. The resulting hydrophobe resin is distilled until it is substantially dehydrated. The heavy viscous mass is poured into moulds and cured in an oven at 70° to 80° C. In 4 days a slightly translucent hornlike material is obtained which has especially high working qualities.

*Example 5.*—30 grams acetone plus 168 grams of 37% formaldehyde (1 mol to 4 mols) are condensed with 10 cc. of 1N NaOH solution. The resulting product is added to a urea-formaldehyde condensation product obtained by heating 200 grams urea, 530 grams 37% formaldehyde and 20 cc. ammonium sulfide (saturated) under reflux for 15 to 20 minutes and removing part of the water by distillation. The mixture can be distilled, without danger of becoming too viscous, to a point where almost all of the water has been expelled, and yields a more or less clear material which is stable and shows no sign of cracking long after its manufacture.

The resin produced in accordance with this example is hydrophilic in nature; that is, the mixture of the acetone and urea resins remains in the sol condition until it is poured and on hardening gelatinizes while in such condition. The products obtained according to Examples 1 to 4, on the other hand, are produced from an intermediate resinous material which is of hydrophobic nature, having been precipitated out of the aqueous solution either immediately upon acidification or during the final distillation. The translucent material obtained according to Example 2 shows relatively few bubbles when magnified 200 diameters, the bubbles, which are probably droplets of water being about 1 to 2 microns in size. The material obtained according to Example 4 had the same appearance under the microscope as that of Example 2 but showed also occasional droplets of about 40 microns in diameter. For the most part the droplets of specimens examined were about 4 microns or less in diameter.

The acetone-formaldehyde condensate can also be used with advantage in the case of hydrophilic phenolic resins made, for example, as described in Examples 1 to 3 but employing larger proportions of formaldehyde and/or sodium hydroxide. The following is a procedure illustrating the use of acetone formaldehyde condensate with a hydrophilic phenolic resin:

*Example 6*

| | Grams |
|---|---|
| Phenol | 200 |
| Formaldehyde (37% solution) | 220 |
| NaOH | 8 | are condensed by boiling under reflux for about thirty minutes, yielding a clear hydrosol. 30 grams of acetone and 210 grams of 37% formaldehyde (molecular ratio 1:5) and 6 cc. of 1N NaOH are condensed separately for 20 minutes at the boiling temperature. The two condensates are then mixed and further condensed for 25 minutes, after which the mixture is acidified with 30 cc. of lactic acid (85%) and distilled. The condensate remains in the sol condition during distillation and is then poured and cooled for about five days at 70–80° C., during which it gels and hardens to a translucent, almost transparent mass. With the aid of a plasticizer, such as glycerine, triacetin or methylphthalylmethylglycollate, the distillation can be continued for a longer time before pouring, yielding a transparent product. To obtain brilliant white resins, about 20 to 30 grams of urea may be added during the distillation, such compound acting to hasten the hardening and causing trapping of numerous small droplets of water within the body of the resin.

*Example 7*

| | Grams |
|---|---|
| Phenol | 200 |
| Formaldehyde (37%) | 212.5 |
| NaOH | 4 | are condensed for 30 minutes under reflux and then mixed with 25 grams acetone and 210 grams of 37% formaldehyde (1 mol to 6 mols) and together condensed under reflux for 30 minutes. The condensate is acidified with 24 cc. lactic acid (85%) and heated under reflux for 15 minutes, the resin separating from the water. The hydrophobe resin is then distilled under vacuum to a viscous mass which is poured into moulds. After 4 days' curing in an oven at 70° to 80° C. a slightly translucent material is obtained which can be easily machined.

*Example 8*

| | | |
|---|---|---|
| Acetone | grams | 25 |
| Formaldehyde (37%) | do | 210 |
| 1N NaOH solution | cubic centimeters | 5 | are condensed under reflux for 30 minutes and then mixed with

| | Grams |
|---|---|
| Phenol | 200 |
| Formaldehyde (37%) | 212.5 |
| NaOH | 4 | and together condensed under reflux for 40 minutes. The product is then acidified with 15 cc. lactic acid and heated for 20 minutes or until separation of the resin takes place. The precipitated resin is then distilled until viscous and is poured into moulds and cured at a temperature of 70° to 80° C. An almost opaque material is obtained which has good working qualities.

*Example 9*

| | Grams |
|---|---|
| Phenol | 200 |
| Formaldehyde (37%) | 212.5 |
| NaOH | 4 | are condensed under reflux for 20 minutes. The molecular proportion of phenol to formaldehyde is 1:1¼. There are then added

| | Grams |
|---|---|
| Acetone | 20 |
| Formaldehyde | 112 | the proportion being 1 mol to 4 mols, and the mixture condensed for 40 minutes. The mass is then acidified with 20 cc. lactic acid and further heated under reflux for 20 minutes until the resin separates from the water. The resin is distilled under vacuum to a heavy viscous product, and is then poured into moulds and cured in an oven at 70° to 80° C. In 3 to 4 days a translucent horn-like material is obtained which has very good working qualities, particularly in connection with turning, drilling and polishing.

It will be noted that in the above examples at least one of the condensates (phenol-formaldehyde or acetone-formaldehyde) is produced before mixing with the materials for the other condensate; that is, the phenol (with or without urea), formaldehyde, acetone and catalyst are not mixed together from the start. Such simultaneous reaction is ordinarily not satisfactory because the retarding effect of an acetone-formaldehyde condensate cannot be realized in this way, at least not to any great extent, and it becomes difficult to dehydrate the resinous condensate to the desired degree. The very violent reaction which takes place in such case probably causes a large part of the acetone to be expelled, as the yield is smaller than with the multi-stage process. However, when either the acetone-formaldehyde or the phenol-formaldehyde condensate is first made separately, a satisfactorily dehydrated product can be obtained, but best results are secured when both condensates are made separately and are then mixed together.

An acetone-formaldehyde condensate can also be employed in processes utilizing a phenol-formaldehyde resin produced with molecular proportions of formaldehyde to phenol of the order of 2.5 or more to 1 as described, for example, in Reissue Patent No. 19,710 to Pollak and Ostersetzer; and it may also be employed in the process described in my copending application Ser. No. 675,095, either together with or in place of the plasticizers mentioned therein.

In the production of the urea-formaldehyde condensates above described, ammonia or amines can be employed in place of ammonium sulfide; and if desired, catalysts can be dispensed with.

The use of formaldehyde is preferred, but other aldehydes, such as acetaldehyde may in some instances be employed with advantage in place of part of the formaldehyde. Methyl-ethyl ketone, butyl ketone and other ketones may be used in place of acetone, but best results are generally obtained with the latter. The lactic acid may be replaced by other organic acids heretofore employed for neutralizing the basic catalyst in phenol-formaldehyde condensation.

Various other substitutions and changes in the proportions, temperatures, times of reaction, etc., may be resorted to by those skilled in the art without departing from the principles of the invention.

I claim:

1. The method of producing a tough, machinable, cast resin, which comprises condensing phenol and formaldehyde in the ratio of 1 mol of the former to approximately 1.1 mols to 2.2 mols of the latter in the presence of a basic condensing agent, adding thereto a considerably smaller quantity of the soluble condensation product of acetone with a much larger molecular proportion of formaldehyde, acidifying and heating the mixture until a hydrophobe resin is precipitated, dehydrating the latter until a product of the desired degree of transparency or opacity on casting and curing is obtained, and finally casting and curing the resinous condensate.

2. The method of producing a tough, machinable, cast resin, which comprises reacting phenol and formaldehyde and an alkali metal hydroxide catalyst under such proportions that a colloidal aqueous resinous solution is obtained, adding thereto the water-soluble condensate of acetone with a considerably larger molecular proportion of formaldehyde produced in the presence of a basic catalyst, heating and acidifying the mixture with an organic acid, in any order, until a hydrophobe resin is precipitated, dehydrating the resin and then casting and curing the same.

3. The method according to claim 1, wherein in order to produce a white, opaque resin having microscopic droplets of water suspended therein, a quantity of urea is added to the reaction mixture.

4. The method according to claim 1, wherein in order to produce an opaque, white resin having microscopic droplets of water suspended therein, a quantity of urea is added when the final distillation temperature has reached about 70° C.

5. The method of producing a tough, machinable, cast resin which comprises condensing 300 grams of phenol with approximately 550 grams of 37% formaldehyde, acidifying the mass with an organic acid and continuing the condensation thereof under reflux until separation of the resin occurs, mixing the latter with the condensation product of approximately 30 grams of acetone and 84 grams of 37% formaldehyde, distilling the mixture and then pouring the mass and hardening it at approximately 60 to 80° C. for several days.

6. The method according to claim 5, wherein, to produce a white product, approximately 30 grams of urea are added during the final distillation.

7. The method of producing tough, machinable, cast resins, which comprises mixing (1) a water soluble condensate of acetone and formaldehyde, (2) the hydrosol obtained by condensing phenol and formaldehyde in the presence of a relatively large quantity of basic catalyst, and (3) a condensate of urea and formaldehyde, boiling the mixture and acidifying the same with an organic acid, distilling the separated resin until the desired degree of dehydration is obtained, and finally casting and hardening the resin.

8. The method of producing a stable, transparent and machinable urea resin, which comprises condensing approximately 200 grams of urea with 530 grams of 37% formaldehyde in the presence of ammonium sulfide, mixing the condensate with the water-soluble condensate of approximately 30 grams of acetone, and 169 grams of 37% formaldehyde, produced in the presence of sodium hydroxide and distilling the mixture under vacuum until a product of the desired degree of transparency on subsequent hardening is obtained, and finally casting and curing the resinous condensate.

9. In the production of insoluble, infusible resins of the cast type, the steps which comprise condensing aqueous formaldehyde and a member of the group consisting of phenol and urea in the presence of a basic condensing agent to produce a water-soluble condensation product, incorporating in said product a member of the group consisting of (1) a water-soluble condensate of acetone and formaldehyde, and (2) a mixture of acetone and formaldehyde, heating and distilling the mass to dehydrate the same to a selected degree, and finally casting and curing the resinous condensate.

10. In the production of insoluble, infusible resins of the cast type, the steps which comprise condensing aqueous formaldehyde and a member of the group consisting of phenol and urea in the presence of a basic condensing agent to produce a water-soluble condensation product, incorporating in said product a water-soluble condensate of one mol of acetone and approximately 4 to 6 mols of formaldehyde, further heating and distilling the mass to dehydrate the same to a selected degree, and finally casting and curing the resinous condensate.

11. In the production of insoluble, infusible resins of the cast type, the steps which comprise condensing phenol and aqueous formaldehyde until a soluble condensate is obtained, incorporating in said condensate a water-soluble condensate of acetone and formaldehyde, heating and distilling the mixture to dehydrate the same to a selected degree after acidification of the mixture, casting the still acid resin and hardening the same at atmospheric pressure at about 60-80° C. for a number of days.

12. In the production of insoluble, infusible resins of the cast type, the steps which comprise condensing urea and aqueous formaldehyde to produce a water-soluble condensate, mixing with the latter a water-soluble condensate of acetone and formaldehyde, heating and distilling the mass to dehydrate it to a selected degree, and thereafter casting the resin and hardening the same at atmospheric pressure at about 60-80° C. for a number of days.

13. A process for the production of insoluble, infusible resins of the cast type comprising condensing 30 grams of acetone with about 252 grams of 37% formaldehyde with a relatively small amount of basic condensing agent until a water-soluble condensate is obtained; separately condensing about 300 grams of phenol with about 300 grams of 37% formaldehyde with a sufficient amount of basic condensing agent to keep the resin in solution; separately condensing about 45 grams urea and about 152 grams of 37% formaldehyde until a condensate is obtained which is still soluble, mixing and further heating the three condensates, acidifying the mass with an organic acid, distilling the hydrophobe resin so obtained until it is substantially dehydrated, and finally casting and curing the resin.

14. The method according to claim 11, wherein a plasticizer is added after the acidification of the mixture.

15. The method of producing a stable, transparent and machinable urea resin which comprises condensing urea and aqueous formaldehyde until a still fusible, water-soluble condensate is obtained, adding thereto a water-soluble condensate of acetone and formaldehyde, distilling the mixture until so much water is expelled that upon casting and curing a transparent resin is obtained, and finally casting and curing the resinous condensate.

16. The method of producing machinable cast resins, which comprises forming a condensate of aqueous formaldehyde and phenol in the presence of an amount of basic condensing agent sufficient to keep the condensate in solution, mixing such condensate with formaldehyde and acetone, further condensing the mixture, dehydrating the resinous reaction product under acid conditions, and then casting the still acid resin and hardening the same.

17. The method of producing machinable cast resins, which comprises forming a water-soluble condensate of formaldehyde and acetone, mixing such condensate with formaldehyde and phenol, condensing the mixture in the presence of a basic condensing agent, acidifying the condensate and further heating the mass until precipitation occurs, dehydrating the precipitated reaction product, casting the latter, and hardening the same.

18. A cast resin comprising the reaction product of formaldehyde and a member of the group consisting of phenol and urea and having incorporated therein a condensation product of acetone and formaldehyde, and prepared in accordance with the process of claim 9.

19. A cast resin comprising the reaction product of formaldehyde and a member of the group consisting of phenol and urea and having incorporated therein a separately formed condensation product of 1 mol acetone and approximately 4 to 6 mols of formaldehyde and prepared in accordance with the process of claim 10.

20. A machinable, cast resin comprising a hardened, dehydrated mixture of an acetone-formaldehyde condensate, a phenol-formaldehyde condensate, and a urea-formaldehyde condensate and prepared in accordance with the process of claim 7.

KARL LOOS.